United States Patent Office 2,739,142
Patented Mar. 20, 1956

2,739,142

METHOD OF PREPARATION OF MOLDABLE COPOLYMERS OF STYRENE AND ACRYLO-NITRILE

Clifford Jones, Linwood, and Bronson Harris and Frank L. Ingley, Midland, Mich., assignors to The Dow Chemical Company, Midland, Mich., a corporation of Delaware No Drawing. Application August 24, 1953,
Serial No. 376,266

9 Claims. (Cl. 260—85.5)

This invention relates to the preparation of thermoplastic copolymers by the interpolymerization of styrene and acrylonitrile. More particularly, this invention provides a method for the interpolymerization of styrene and acrylonitrile, whereby the rate of polymerization and the molecular weight of the polymer product are readily controlled to the end that solid, moldable resins are obtained.

Copolymers of from about 65 to about 80 per cent by weight styrene and correspondingly from about 35 to about 20 per cent acrylonitrile are known to be resistant to the solvent action of, and attack by, certain liquids such as gasoline, carbon tetrachloride and other dry cleaning solvents, alcohol, water, aqueous acids and aqueous alkalies. Such copolymers are known as "solvent-resistant" resins, even though they can be swollen and/or dispersed in certain solvent liquids such as methyl ethyl ketone. Copolymers having the property of resistance to the solvent action of gasoline, etc., are valuable in the preparation of useful articles which in use are in contact with, and must be resistant to, such liquids. When properly prepared, copolymers of styrene and acrylonitrile in the above stated proportions are strong, hard, rigid plastics which are readily molded and shaped by conventional means, such as by compression or injection molding, extrusion, welding, hot pressing, etc.

However, it has not been easy to prepare consistently good products by the copolymerization of styrene and acrylonitrile. The polymerization reaction is strongly exothermic and often tends to be dangerously vigorous, making it difficult to control the temperature of the reaction mixture. It has also been difficult to obtain copolymers of styrene and acrylonitrile which are readily moldable to articles having satisfactory mechanical properties. It is known that ease of molding, and at least some of the mechanical properties, of thermoplastic resin products are related to the molecular weight of the polymer. Plastics fabricators know that resins having good molding characteristics are those which flow readily at the molding temperature. It is also known that polymers having a lower average molecular weight flow more readily, and hence mold more easily, at a molding temperature than do polymers having a higher molecular weight. The higher molecular weight polymers generally require higher molding temperatures and longer molding cycles than do lower molecular weight polymers, the upper limit of molding temperature being reached when thermal degradation of the resin begins to take place. On the other hand, lowering of the molecular weight of the resin tends to make products which are weak and brittle. Plastic fabricators have found that, for the production of solvent-resistant moldings, i. e. moldings resistant to attack by the above-mentioned liquids, the copolymers of styrene and acrylonitrile should have a molecular weight range such that 10 per cent by weight solutions thereof in methyl ethyl ketone, i. e. butanone, have viscosities between 6 and 40, preferably between 10 and 30, centipoises at a temperature of 25° C. Suitable copolymers must also be homogeneous, transparent and free of objectionable impurities.

It is also known that the molecular weight of the styrene acrylonitrile copolymer is related to the temperature of the polymerization, lower temperatures giving rise to higher molecular weight products and, conversely, higher temperatures giving rise to products of lower molecular weight. However, the rate of polymerization is also related to the temperature of polymerization, and the reaction rate increases rapidly with increase in temperature. Herein lies the dilemma of the copolymer manufacturer: in order to make solvent-resistant copolymers of styrene-acrylonitrile whose solution viscosities are within the above-specified range, polymerization temperatures are required at which the rate of reaction is so very great as to make control of the reaction extremely difficult if not entirely impossible. If the reaction rate is moderated by lowering the polymerization temperature, the solution viscosity of the resultant copolymer product is unsatisfactorily high.

It has been proposed to copolymerize styrene and acrylonitrile in aqueous emulsion and to control the rate of polymerization and the composition of the product by regulating the rate of addition of one or both of the monomers. While such a method probably serves to moderate the vigor of the polymerization reaction and has been alleged to produce a more uniform chemical composition in the resulting polymer than is obtained when a mixture of all of the monomers is polymerized as a batch, it is nevertheless not entirely satisfactory. Aqueous emulsion methods introduce additional difficulties, particularly where the end product is to be a molded article. Such methods usually employ dispersing agents, catalysts, buffers, salts, stabilizers, modifiers and the like which are difficult to separate from the polymer. Usually, the polymer is precipitated from the emulsion by the addition of a coagulant, thereby introducing still another foreign substance into the system. Moreover, such methods do not effect control of the molecular weight of the copolymer and such products have not been wholly satisfactory for use as molding materials.

It is an object of this invention to provide an improved method for the preparation of thermoplastic copolymers by the interpolymerization of styrene and acrylonitrile. More particularly, it is an object of this invention to provide such a method for the preparation of solvent-resistant copolymers of styrene and acrylonitrile. Still more particularly, it is an object of this invention to provide such a method whereby the rate of the interpolymerization reaction and the molecular weight of the copolymer product, as evidenced by its solution viscosity, can be readily controlled. Specifically, an object is to provide such a method whereby, in a controllable manner, a homogeneous copolymer of from 65 to 80 per cent by weight styrene and correspondingly from 35 to 20 per cent by weight acrylonitrile can be produced, which copolymer, as a 10 per cent by weight solution in butanone, has a viscosity of from 6 to 40 centipoises and which is capable of being molded to strong, hard, rigid articles. Other objects and advantages will be evident from the following description.

The objects of this invention are attained by heating, at a temperature between about 130° and about 175° C., a homogeneous liquid mixture of from 65 to 80 per cent by weight styrene and from 35 to 20 per cent by weight acrylonitrile to which mixture has been added a minor amount of at least one modifying agent selected from the class consisting of aromatic hydrocarbons of the benzene series and nuclear chlorinated derivatives thereof, whereby interpolymerization of styrene and acrylonitrile is effected until the polymerization mixture contains up to 70 per cent, preferably 20 to 50 per cent, by weight of the resulting copolymer product which is thereafter separated from the non-polymeric components of the reaction mixture. A part of the styrene may be replaced by alpha-methylstyrene, i. e., a homogeneous mixture of from 35 to 80 per cent by weight styrene, from 30 to 0 per cent by weight alpha-methylstyrene, and from 35 to 20 per cent acrylonitrile may be treated by the procedure described herein.

The modifiers of polymerization according to this invention are benzene, homologues of benzene and nuclear chlorinated derivatives thereof having the general formula

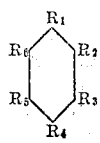

wherein the R symbols represent hydrogen atoms, alkyl radicals or chlorine atoms. Illustrative of compounds having such formula are: benzene, toluene, xylenes, polymethylbenzenes, ethylbenzene, ethyltoluenes, ethylxylenes, diethylbenzenes, diethyltoluenes, polyethylbenzenes, isopropylbenzene, isopropyltoluenes, isopropylxylenes, isopropylethylbenzenes, isopropylethyltoluenes, isopropyldiethylbenzenes, diisopropylbenzenes, diisopropyltoluenes, polyisopropylbenzenes, chlorobenzene, di-, tri-, and polychlorobenzenes, nuclear mono-, di-, tri-, and polychlorotoluenes, nuclear chlorinated xylenes, nuclear mono- and poly-chlorinated ethylbenzene, and other nuclear chlorinated homologues of benzene. While all of these substances and mixtures thereof are operable in the practice of this invention, they are not fully equivalent in the degree of their effect on the polymerization process and on the copolymer product, as will be more fully explained below. The polymerization reaction mixture usually comprises from 10 to 30 per cent by weight of one or more of the above modifiers although in some instances as little as 5 weight per cent or as much as 50 weight per cent of modifier based on the polymerization reaction mixture can be satisfactorily employed to effect the desired control of the rate of polymerization and of the solution viscosity of the copolymer product.

The modifiers of polymerization of this invention are stable substances, chemically inert under the conditions of the polymerization. It is not known certainly how their moderating function is effected, but it is possible that these modifiers enter the activation process and are involved as chain transfer agents during the polymerization reaction. The modifiers are not chemically combined with the copolymer product and can be readily separated therefrom at the completion of the polymerization step.

The process of this invention is essentially a modified mass, i. e. bulk, polymerization. The reaction charge consists of a homogeneous mixture of a polymerizable portion and the modifier portion. As previously stated, the polymerizable portion consists, by weight, of from 20 to 35 per cent acrylonitrile, from 35 to 80 per cent styrene and from 0 to 30 per cent alpha-methylstyrene. The modifier portion, being not more than equal in weight to the polymerizable portion, consists of at least one aromatic hydrocarbon of the benzene series of nuclear chlorinated derivative thereof. The charge should be substantially free of water and inhibitors of polymerization. Preferably no catalyst is added, although a small amount of a free-radical generating catalyst, e. g. an organic peroxygen compound, may be used if desired, but is unnecessary.

The polymerization reaction may be carried out in batch, semi-continuous or continuous manner, although the continuous manner is preferred. The polymerizable materials and the modifier may be fed separately into admixture in the reaction zone at rates equivalent to the desired composition of mixture, or the polymerizable materials may be premixed. Preferably, the entire charge of polymerizable materials and modifier is premixed in desired proportions and fed into a polymerization zone. The design of the apparatus of the polymerization reaction is not particularly critical as long as adequate mixing of the contents and heat transfer to and from the system is provided. A particularly satisfactory arrangement, but by no means the only arrangement, of apparatus comprises an elongated tubular coil in the form of a closed circuit including a pump for rapidly circulating the contents of the coil and including means for effecting transfer of heat indirectly between the contents of the coil and an external heat transfer medium, and including means for feeding a reaction charge to the coil and, at a point remote from the point of feed, means for withdrawing a part of the contents of the coil at a rate by weight equal to the rate of feed to the coil. The size of the reactor and the rate of feed thereto are chosen so that the desired production rate can be obtained.

The temperature of the polymerization mixture in the polymerization reaction zone is between 130° and 175° C., preferably between about 140° and about 165° C., although somewhat lower and higher temperatures may be employed if desired. At temperatures appreciably lower than about 130° C. the reaction proceeds at an uneconomically slow rate and the solution viscosity of the copolymer tends to be too high unless relatively large proportions of modifier are employed which have the effect of further reducing the rate of polymerization. Conversely, at temperatures appreciably higher than about 175° C., the rate of polymerization tends to be too high unless a relatively large proportion of modifier is employed which has the effect of reducing the solution viscosity to an undesirable degree.

The polymerizable materials in the reaction zone are polymerizable materials in the reaction zone are polymerized until the reaction mixture contains not more than 70 per cent, preferably from 20 to 50 per cent, of its weight of the copolymer product. While operations producing reaction mixtures containing less than 20 per cent by weight of polymer are permissible, such operations are usually less economical since larger amounts of unreacted materials remain to be separated and recovered and a smaller rate of production of polymer is obtained. Reaction mixtures containing more than 70 per cent by weight of polymer tend to be increasingly viscous which in turn makes heat transfer more difficult. Moreover, more than 70 weight per cent polymer in the reaction mixture tends to cause some cross-linking or even to form "popcorn" polymer. Although these tendencies are somewhat reduced by the presence of the modifiers of the present invention, such undesirable kinds of polymerization must be avoided.

In the preferred continuous modifications of this method, the rate of feed of materials to the reaction zone is adjusted to maintain the desired polymer concentration in the reaction mixture.

The copolymer product can be separated from the unreacted monomeric material and the modifier by any desired means, e. g. by heating under vacuum to vaporize and remove non-polymeric material, or by precipitation of the polymer in a non-solvent liquid in which the non-polymeric materials are soluble.

In general, the greater the proportion of modifier employed in the feed mixture, the greater the reduction in rate of polymerization and in the viscosity of a solution of the copolymer product. However, the various individual modifiers are not identical in their effectivity. For example, under a particular set of conditions, a representative group of modifiers influence the rate of polymerization in the following order of decreasing effectivity: benzene, polyisopropylbenzene, chlorobenzene, o-dichlorobenzene, toluene and ethylbenzene. Under the same conditions, the effect of these same agents in reducing the solution viscosity of the polymer product is not in the same order as that for their effect on the rate of polymerization. Instead, their effectivity, as modifiers of solution viscosity of the copolymer product, in decreasing order, is: polyisopropylbenzene, benzene, ethylbenzene, toluene, o-dichlorobenzene, and chlorobenzene.

The invention will now be illustrated by means of examples which should not be construed as limiting the invention. In the examples, parts and percentages are by weight unless otherwise indicated.

EXAMPLE 1

This example illustrates the use of certain representative modifiers in the process of the invention.

A mixture of 70 per cent monomeric styrene and 30 per cent monomeric acrylonitrile was prepared. To each of several portions of such monomeric mixture was then added one of the modifiers identified hereinafter in the proportions of 70 per cent of the monomer mixture and 30 per cent of the modifier. Thus, each modified mixture contained 49 per cent styrene, 21 per cent acrylonitrile and 30 per cent of a modifier. Separately, each of these mixtures, identified as A through F, was fed to a continuous polymerizer.

The continuous polymerizer comprised a tubular coil containing about 86 inches of 1-inch pipe arranged in a closed circuit with a pump for circulating the contents thereof and provided with heat-transfer means for maintaining a temperature of 148–152° C. therewithin. The capacity of the reaction zone was approximately 1100 grams of reaction mixture. Means were provided for introducing the feed mixture into the coil at a known controllable rate. At a point in the coil remote from the point of introducing of the feed, means were provided for withdrawing a portion of the circulating reaction mixture at a rate equal to the rate of introduction of the feed mixture while maintaining sufficient pressure in the reaction zone to maintain the polymerization mixture in the liquid state. The rate of feed of each mixture was adjusted to maintain a concentration of approximately 20 per cent of the copolymer product in the reaction mixture. The withdrawn portion of the reaction mixture was passed into a continuous vacuum devolatilizer where, under 5–10 mm. Hg absolute pressure and with the application of heat, the non-polymeric components were flashed off and the copolymer product obtained as a residue containing less than 1 per cent residual volatile matter.

In Table I are shown, for each of the feed mixtures A through F, the identity of the modifier, the average rate of polymerization in terms of the parts by weight of copolymer formed per hour per 100 parts by weight of reaction mixture in the polymerization reaction zone, and the solution viscosity and tensile strength of the copolymer product. The solution viscosity of the copolymer product is the viscosity in centipoises of a 10 per cent solution of the copolymer in butanone at a temperature of 25° C. The tensile strength of each of the copolymer products was determined on injection molded test bars in the usual manner and is recorded in Table I as the pulling force at break in pounds per square inch cross-section.

The unmodified copolymerization of a mixture of 70 parts styrene and 30 parts acrylonitrile at a temperature of 150° C. proceeds at a very rapid and dangerous rate and the product of copolymerization of such mixture has a high solution viscosity and is difficult to mold. In contrast, the polymerization in the presence of modifiers which are reported in Table I proceeded at a moderate, readily controlled rate and all of the copolymers were readily molded by the injection process and gave clear, hard products.

Table I

| Feed Mixture | Modifier, 30 percent of Feed Mixture | Avg. Rate of Polymerization, Percent Per Hour | Viscosity, Cps., 10 Percent in Butanone | Tensile Strength, P. s. i. |
|---|---|---|---|---|
| A | Benzene | 10.9 | 9.5 | 8,020 |
| B | Toluene | 27.5 | 17.2 | 9,870 |
| C | Ethylbenzene | 27.9 | 10.9 | 10,160 |
| D | Polyisopropylbenzene [1] | 14.3 | 5.1 | 4,940 |
| E | Chlorobenzene | 16.2 | 23.3 | 9,890 |
| F | o-Dichlorobenzene | 24.1 | 17.2 | 10,050 |

[1] A mixture of tri-, tetra-, and higher-isopropylated benzenes.

It will be noted from the table that the modifiers used varied in their effect upon the rate of polymerization and the solution viscosity of the polymer. The product from feed mixture D, using 30 per cent polyisopropylbenzene, was slightly inferior to the others in tensile strength and elongation, correlating with its lower molecular weight as shown by the low solution viscosity value. Therefore, polyisopropylbenzene was retested at a concentration of 20 per cent of the feed mixture. A feed mixture containing 56 per cent styrene, 24 per cent acrylonitrile (ratio 70 parts styrene to 30 parts acrylonitrile) and 20 per cent polyisopropylbenzene was fed to the same continuous polymerizer under the same conditions as described above. In Table II, this test is compared to the test on Feed Mixture D from Table I.

Table II

| Modifier | Avg. Rate of Polymerization, Percent Per Hour | Viscosity, Cps., 10 Percent in 2-butanone | Tensile Strength, P. s. i. |
|---|---|---|---|
| Polyisopropylbenzene: | | | |
| 20% of feed mixture | 20.9 | 9.9 | 9,820 |
| 30% of feed mixture | 14.3 | 5.1 | 4,940 |

Compared to the consequences of using the larger proportion of polyisopropylbenzene, the use of the lower proportion resulted in a faster copolymerization reaction and gave a product having a higher solution viscosity (indicative of a higher molecular weight) and a higher tensile strength.

EXAMPLE 2

This example shows the effect of the concentration of a modifier, specifically ethylbenzene, in the feed mixture on the copolymerization of styrene and acrylonitrile.

A mixture was prepared consisting of 70 parts styrene and 30 parts acrylonitrile. To separate portions of this mixture was added ethylbenzene in proportion corresponding to 10, 20, 30, 40 and 50 weight per cent, respectively, of the resulting feed mixtures. These feed mixtures were then polymerized at a temperature of approximately 145° C. in the apparatus described in Example 1. In Table III is shown for each of the tests the average rate of polymerization in terms of the weight of copolymer formed per hour per 100 parts by weight of reaction mixture contained in the polymerization reaction zone. The table also shows the viscosity in centipoises at 25° C. of a 10 per cent solution of the copolymer product in butanone and the tensile strength in pounds per square inch at break of the copolymer. All of these products were readily injection molded.

Table III

| Ethylbenzene Modifier, Percent of Feed Mixture | Avg. Rate of Polymerization, Percent Per Hour | Viscosity, Cps., 10% in Butanone | Tensile Strength, p. s. i. |
|---|---|---|---|
| 10 | 42.2 | 37.4 | 9,750 |
| 20 | 29.7 | 27.7 | 9,750 |
| 30 | 19.7 | 18.1 | 10,030 |
| 40 | 17.0 | 12.5 | 9,056 |
| 50 | 9.5 | 8.6 | 7,810 |

EXAMPLE 3

This example shows the effect of variations in the polymerization temperature on the copolymerization of styrene and acrylonitrile in the presence of a modifier, specifically ethylbenzene.

A number of runs were made in the manner described in Example 1 using feed mixtures of 70 parts of styrene and 30 parts of acrylonitrile to which had been added various proportions of ethylbenzene. These runs were made at various temperatures and the rates of polymerization and the properties of the products were determined in the usual way. These data are averaged and summarized in Table IV wherein the headings have the meanings previously described.

Table IV

| Temperature, °C. | Ethylbenzene, Percent in In Feed | Avg. Rate of Polymerization, Percent Per Hour | Viscosity, Cps., 10 Percent in Butanone |
|---|---|---|---|
| 130 | 20 | 18 | 36 |
|  | 30 | 12 | 25 |
| 140 | 10 | 43 | 38 |
|  | 20 | 30 | 26 |
|  | 30 | 20 | 18 |
| 150 | 10 | 72 | 28 |
|  | 20 | 50 | 19 |
|  | 30 | 35 | 13 |
| 160 | 20 | 80 | 15 |
|  | 30 | 55 | 10 |
| 170 | 30 | 90 | 7.5 |

From the table, it can be readily seen that by selection of temperature and concentration of modifier any desired combination of rate of polymerization and solution viscosity of the product can be obtained. Other modifiers than ethylbenzene give results similar to, but differing in degree from, those shown for ethylbenzene, thereby affording a still greater latitude of choice of conditions to achieve a desired result.

EXAMPLE 4

To two portions of a mixture of monomers consisting of 30 parts acrylonitrile, 61 parts styrene and 9 parts alpha-methylstyrene ethylbenzene was added, as a polymerization modifier, in amount corresponding to 10 per cent and 30 per cent, respectively, of the combined ethylbenzene and monomers. The resulting compositions were then separately polymerized at a temperature of 145° C. in the apparatus, and in the manner, described in Example 1. In Table V are shown for each test the proportion of ethylbenzene in the feed mixture, the average rate of polymerization, in parts polymer formed per hour per 100 parts of reaction mixture in the polymerization zone, the solution viscosity of the copolymer product and the tensile strength of an injection molded test bar.

Table V

| Ethylbenzene Modifier, Percent of Feed Mixture | Avg. Rate of Polymerization, Percent Per Hour | Viscosity, Cps., 10% In Butanone | Tensile Strength, p. s. i. |
|---|---|---|---|
| 10 | 47.6 | 14.4 | 9,980 |
| 30 | 23.7 | 10.9 | 10,096 |

We claim:

1. A method which comprises heating in a polymerization reaction zone at a polymerization temperature between 130° and 175° C. a homogeneous liquid reaction mixture comprising a polymerizable composition and a polymerization modifier, said polymerizable composition consisting by weight of from 20 to 35 per cent acrylonitrile, from 80 to 35 per cent styrene and from 0 to 30 per cent alpha-methylstyrene, said polymerization modifier being from 10 to 40 per cent by weight of the reaction mixture and consisting of at least one monocyclic aromatic compound having only benzoid unsaturation and selected from the class consisting of aromatic hydrocarbons of the benzene series and nuclear chlorinated derivatives thereof, continuing the heating of said reaction mixture until the same contains not more than 70 per cent by weight of a copolymeric product and separating from at least a portion of the resulting reaction mixture a copolymeric product having a viscosity of from 6 to 40 centipoises when measured as a 10 weight per cent solution in butanone at 25° C.

2. A method which comprises feeding to a polymerization reaction zone a homogeneous feed mixture comprising a polymerizable composition and a polymerization modifier, said polymerizable composition consisting by weight of from 20 to 35 per cent of acrylonitrile, from 80 to 35 per cent of styrene and from 0 to 30 per cent of alpha-methylstyrene, said polymerization modifier being from 10 to 40 per cent by weight of the feed mixture and consisting of at least one monocyclic aromatic compound having only benzoid unsaturation and selected from the class consisting of aromatic hydrocarbons of the benzene series and nuclear chlorinated derivatives thereof, heating the polymerization reaction mixture contained in said polymerization reaction zone at a polymerization temperature between 130° and 175° C. until said reaction mixture contains from 20 to 50 per cent by weight of a copolymeric product, withdrawing at least a portion of said reaction mixture containing 20 to 50 per cent by weight of a copolymeric product from said polymerization reaction zone and separating said copolymeric product from the portion of said reaction mixture so withdrawn, said copolymeric product having a viscosity of from 6 to 40 centipoises when measured as a 10 weight per cent solution in butanone at 25° C.

3. A method which comprises feeding to a polymerization reaction zone a homogeneous feed mixture comprising a polymerizable composition and a polymerization modifier, said polymerizable composition consisting by weight of from 20 to 35 per cent acrylonitrile and from 80 to 65 per cent styrene, said polymerization modifier being from 10 to 40 per cent by weight of the feed mixture and consisting of at least one monocyclic aromatic compound having only benzoid unsaturation and selected from the class consisting of aromatic hydrocarbons of the benzene series and nuclear chlorinated derivatives thereof, heating the polymerization reaction mixture contained in said polymerization reaction zone at a polymerization temperature between 130° and 175° C. until said reaction mixture contains not more than 50 per cent by weight of a copolymeric product, withdrawing at least a portion of said reaction mixture containing not more than 50 per cent by weight of a copolymeric product from said polymerization reaction zone and separating said copolymeric product from the portion of said reaction mixture so withdrawn, said copolymeric product having a viscosity of from 6 to 40 centipoises when measured as a 10 weight per cent solution in butanone at 25° C.

4. A method which comprises feeding to a polymerization reaction zone a homogeneous feed mixture consisting by weight of from 60 to 90 per cent of a polymerizable composition and from 40 to 10 per cent of a polymerization modifier, said polymerizable composition consisting by weight of from 20 to 35 per cent acrylonitrile and from 80 to 65 per cent styrene, said polymerization modifier being at least one monocyclic aromatic compound having only benzoid unsaturation and selected from the class consisting of aromatic hydrocarbons of the benzene series and nuclear chlorinated derivatives thereof, heating the polymerization reaction mixture contained in said polymerization reaction zone at a polymerization temperature between 130° and 175° C. until said reaction mixture contains from 20 to 50 per cent by weight of a copolymeric product, withdrawing at least a portion of said reaction mixture containing from 20 to 50 per cent by weight of a copolymeric product from said polymerization reaction zone and separating said copolymeric product from the portion of reaction mixture so withdrawn, said copolymeric product having a viscosity of from 6 to 40 centipoises when measured as a 10 weight per cent solution in butanone at 25° C.

5. A method as claimed in claim 4, wherein the polymerization modifier is benzene.

6. A method as claimed in claim 4, wherein the polymerization modifier is toluene.

7. A method as claimed in claim 4, wherein the polymerization modifier is ethylbenzene.

8. A method as claimed in claim 4, wherein the polymerization modifier is polyisopropylbenzene.

9. A method as claimed in claim 4, wherein the polymerization modifier is chlorobenzene.

References Cited in the file of this patent

UNITED STATES PATENTS

| | | |
|---|---|---|
| 2,449,528 | Flowers et al. | Sept. 14, 1948 |
| 2,646,423 | Wehr et al. | July 21, 1953 |
| 2,675,370 | Barrett | Apr. 13, 1954 |